United States Patent
Engels et al.

(10) Patent No.: US 12,517,879 B1
(45) Date of Patent: Jan. 6, 2026

(54) MULTI-ASPECT VECTOR SEARCH INDEX CREATION AND RETRIEVAL METHOD AND SYSTEM

(71) Applicant: Xillio AI BV, Hilversum (NL)

(72) Inventors: Rikkert Engels, Loosdrecht (NL); Jorn Verhoeven, Maarssen (NL)

(73) Assignee: Xillio AI BV, Hilversum (NL)

( * ) Notice: Subject to any disclaimer, the term of this patent is extended or adjusted under 35 U.S.C. 154(b) by 0 days.

(21) Appl. No.: 19/039,631

(22) Filed: Jan. 28, 2025

(51) Int. Cl.
  *G06F 16/22* (2019.01)
  *G06F 16/2457* (2019.01)
  *G06F 16/908* (2019.01)
  *G06F 16/93* (2019.01)

(52) U.S. Cl.
  CPC .... *G06F 16/2237* (2019.01); *G06F 16/24578* (2019.01); *G06F 16/908* (2019.01); *G06F 16/93* (2019.01)

(58) Field of Classification Search
  CPC .............. G06F 16/93; G06F 16/24578; G06F 16/2237; G06F 16/908; G06N 20/00
  See application file for complete search history.

(56) References Cited

U.S. PATENT DOCUMENTS

| | | | |
|---|---|---|---|
| 2022/0350828 A1* | 11/2022 | Ma | G06F 16/3347 |
| 2023/0119161 A1* | 4/2023 | Yadaw | G06F 40/30 |
| | | | 707/706 |
| 2023/0376828 A1* | 11/2023 | Zhao | G06N 3/045 |
| 2024/0362286 A1* | 10/2024 | He | G06F 16/93 |
| 2025/0061136 A1* | 2/2025 | Saini | G06F 16/316 |
| 2025/0068665 A1* | 2/2025 | Chandel | G06F 16/338 |

FOREIGN PATENT DOCUMENTS

EP 4339803 A1 3/2024

OTHER PUBLICATIONS

"Embedding Metadata for Improved Retrieval", Haystack by Deepset, Aug. 27, 2024, 4 Pages.
Bijit Ghosh, "Vector Databases for Gen AI Applications", Retrieved from the Internet:URL:https://medium.com/@bijit211987/powerof-vector-databases-for-gen-ai-applications-a63d4cf7e352, Dated Sep. 30, 2023, Entire Document.
International Search Report and Written Opinion Application No. PCT/EP2025/052149, dated Jun. 26, 2025, 19 Pages.

* cited by examiner

*Primary Examiner* — Hau H Hoang
(74) *Attorney, Agent, or Firm* — AEON Law, PLLC; Adam L.K. Philipp (57) ABSTRACT

A computer-implemented method for creating and utilizing a multi-aspect vector search index is disclosed. The method involves generating multi-dimensional vectors representing digital documents within a document repository, enabling advanced content retrieval through comprehensive vector-based indexing. The approach allows for sophisticated search capabilities by mapping documents across multiple aspects, facilitating precise and efficient content identification and extraction from extensive document collections.

20 Claims, 6 Drawing Sheets

MULTI-ASPECT VECTOR SEARCH INDEX CREATION AND RETRIEVAL METHOD AND SYSTEM

TECHNICAL FIELD

One embodiment relates to a computer-implemented method for creating a search index for a collection of digital documents stored in a document repository, and another embodiment relates to a computer-implemented method for retrieving one or more pieces of content from a collection of documents stored with multi-aspect vectors in a digital document repository. Another embodiment relates to systems configured to execute such methods. A further embodiment relates to computer program products configured to perform the proposed methods and to computer-readable media comprising such computer programs.

BACKGROUND

Organizations often collect large volumes of documents containing administrative and/or technical information useful for their business. However, organizations do not always have the resources to store their documents in an easily searchable manner.
Recent advances in information searching and document retrieval systems have led to the use of vector embeddings to represent the contents of documents and search queries through vectors that exist in a high-dimensional vector space. In vector-based embedding techniques, semantically similar items are represented by vectors that lie closer together within this vector space based on an appropriate distance metric. When vector embedding techniques are used for semantic document searching, the textual data (e.g., words, sentences, paragraphs, or the entire document) is transformed using trained language models, such as Bidirectional Encoder Representations from Transformers (BERT) or Generative Pre-trained Transformer (GPT). The textual data is thereby represented using high-dimensional vectors to enable effective matching of queries to documents based on the meaning of the document content rather than on literal matching between keywords in a query and words in the documents. However, quickly retrieving the most relevant documents from a large-scale repository remains challenging.

BRIEF DESCRIPTION OF DRAWINGS

Embodiments will now be described, by way of example only, with reference to the accompanying schematic drawings in which corresponding reference symbols indicate corresponding parts. Multiple instances of an element may each include separate labels appended to the reference number (for instance, "78a" and "78b"). The reference number may be used without an appended label (e.g., "78") to generally refer to an unspecified instance or to all instances of that element. Similarly, a specific instance of an element may be designated with a single quote, e.g., "54'" vs. "54".

The figures are meant for illustrative purposes only and do not serve as a restriction of the scope or the protection as laid down by the claims.

DETAILED DESCRIPTION

The following is a description of certain embodiments, given by way of example only and with reference to the figures.

In one embodiment there is provided a computer-implemented method for creating a search index for a collection of documents, as used herein, "documents" may refer to any suitable form of digital content (text, audio, images, video, multimedia, and the like) that may have metadata and information bearing (content) data, stored in a digital document repository, and/or a computer-implemented method for retrieving one or more documents from a collection of documents stored using corresponding multi-aspect vectors having structure and dimension obtainable from executing a computer-implemented method for creating the search index.

Some embodiments include an embedding technique wherein a document content vector is fused with document metadata aspect vectors (and possibly supplementary aspect vectors) in a way that preserves the ordering of distinct contributions each aspect vector space has made to the resulting multi-aspect vector space. Each kind of document metadata may have a determined structure, based on which a distinct embedding is calculated by transforming the contents and structure of this metadata aspect into a vector that resides in a vector space belonging to this metadata aspect. The document content vector and a plurality of metadata aspect vectors are precomputed for each document, and the resulting vector contributions are fused into a corresponding multi-aspect vector for each document, which is then stored in the document database. Storing and retrieving documents based on fused multi-aspect vector embeddings allows faster and more efficient identification and retrieval of relevant documents in response to search or document comparison queries. Multi-aspect vector embeddings is particularly useful when dealing with large-scale collections of digital documents.

By embedding the semantic content (or other information-bearing data) of documents, embedding the metadata aspects and other aspects of these documents, and then fusing the resulting embedding vectors into a composite vector in a deterministic manner, the method can provide an efficient search embedding and allows search queries to retrieve relevant existing documents with accurate results, in a way that reduces the calculation load (in terms of fewer processing clock cycles per query) needed for producing relevant document search results. The method does not need to proceed through iterative stages of post-filtering based on input from the user who attempts to fine-tune the search and indexing results. With the more comprehensive fused embedding, the result of an initial search query is more likely to be accurate and relevant, thus needing less iterative search query adjustments and post-filtering information to be supplied by the user. The operational load on the system's power, hardware, and software resources is thereby reduced. This reduced number of queries and post-filtering of search results means that more computing resources (in calculations and/or expended energy per unit of time) remain available for other tasks or user queries. By implementing the proposed method on a computer (device, system, or network), the computer can handle more queries and is, therefore, easier to scale up to larger numbers of concurrent users and interactions.

The term "embedding" refers herein to the process of generating vectors from the document content and/or metadata, thereby representing the data in a structured and meaningful way. Each vector produced by a particular embedding operation is composed of an ordered tuple of components (the number of components N having a positive integer value, i.e., $N=1, 2, 3, \ldots \in \mathbb{N}^+$), wherein the number and mutual ordering of the vector components depends on the particular embedding operation, whereas the actual numerical values obtained for each vector component depends on the input of the embedding operation.

The term "vector space" is used herein in a specific sense, referring to the space that includes all possible vectors that may be produced using the embedding operation. However, vector embedding methods are typically devised to produce only vectors within a specified subspace corresponding to a finite range of magnitudes (e.g., from −1 to 1) so that the entire set of possible vectors can be normalized and the distance metrics defined between pairs of vectors stay within well-defined bounds and remain meaningful. In the present context, the term vector space therefore does not refer to a vector space in a strict mathematical sense because additions or subtractions of two vector embedding elements typically has no sensible meaning and/or may produce vectors that fall outside the subspace of allowed magnitudes.

The term "indexing" refers herein to processes in which vectors and their neighbours are clustered to allow quicker and/or more efficient retrieval.

Figure 1:
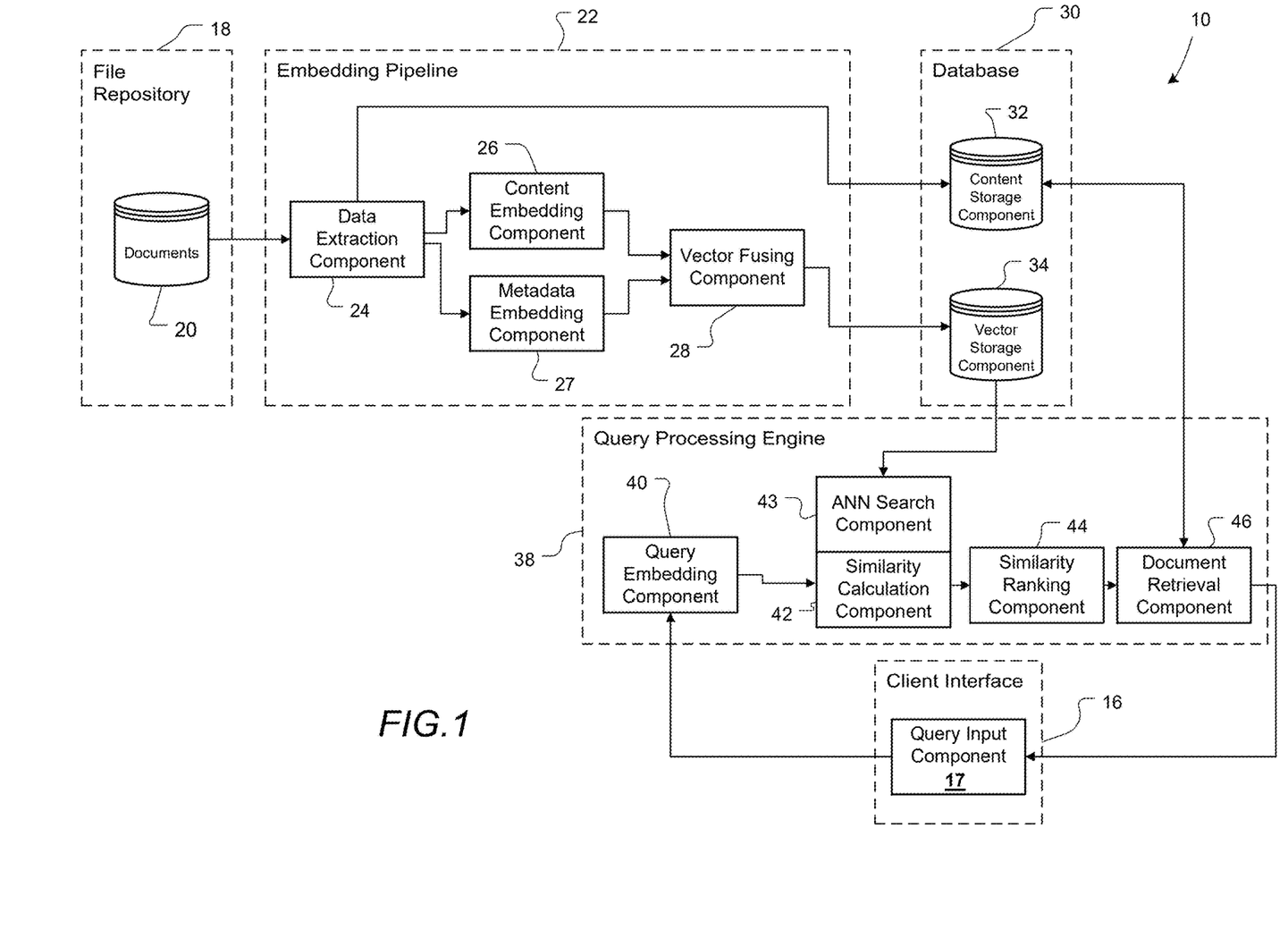
FIG. 1 schematically shows a component diagram of a computer-implemented system for retrieving documents from a document collection using vector embeddings, according to an embodiment.

FIG. 1—System Components

FIG. 1 schematically presents a functional component diagram illustrating an exemplary embodiment of a computer-implemented System 10 for creating search indexes from documents and for retrieving one or more documents from a collection of documents using vector embeddings.

System 10 is configured to ingest source documents 20 existing in a customer File Repository 18 (e.g., a collection of customer's technical documents, project documents, e-mails, images, videos, music, multimedia content, etc.) and to transform these documents 20 into searchable embedding vectors and content objects that are stored within a database 30 of the System 10. A user with access rights to File Repository 18 can subsequently submit a query to System 10. System 10 is configured to process and transform the query into an embedding vector, which has a pre-defined vector structure that is compatible with the structure of the vectors that were obtained during the embedding of the ingested documents. System 10 is further configured to compare and determine a degree of similarity or closeness between, on the one hand, the vector associated with the query and, on the other hand, the vectors associated with ingested documents. System 10 is further configured to determine, from the results of the comparisons, which document(s) is (are) considered relevant for the information in the query. Based on these results, System 10 returns 124 to the user a set of documents 125 or a set of references that point to the storage locations of those documents.

The exemplary System 10, shown in FIG. 1, includes a Client Interface 16, a File Repository 18, an Embedding Pipeline 22, a Database 30, and a Query Processing Engine 38.

Embedding Pipeline 22 includes a Data Extraction Component 24, a Content Embedding Component 26, a Metadata Embedding Component 27, and a Vector Fusing Component 28.

Database 30 includes a Content Storage Component 32 and a Vector Storage Component 34.

Query Processing Engine 38 includes a Query Embedding Component 40, a Similarity Calculation Component 42, an approximate nearest neighbour (ANN) Search Component 43, a Similarity Ranking Component 44, and a Document Retrieval Component 46.

In this example, the Embedding Pipeline 22 is configured to receive documents one-by-one from a Document (or other digital content) Storage 20 that is stored in File Repository 18 and which may be located on one or more remote sites external to System 10. In this example, the Embedding Pipeline 22 is further configured to forward a respective Document 54' and make binary data contained in this respective Document 54' available to the Extraction Component 24, which in this example proceeds in a first-document-in-first-document-out (FIFO) order. The Embedding Pipeline 22 may be activated if a document is added to File Repository 18 or if an existing document in File Repository 18 is updated or otherwise changed.

The Extraction Component 24 is configured to use text extraction methods, such as optical character recognition (OCR), convolutional neural network (CNN), Shazam Algorithm, or the like, to identify structured information about the semantic contents and/or layout of the document. The document content obtained by the Extraction Component 24 is forwarded to the Content Embedding Component 26.

Extraction Component 24 is additionally configured to extract existing metadata from the document, which may be stored within the document file but is separate from the semantic content. Examples of such metadata include a creation date, a modification date, a deletion date, a file title, a file size, a file type, an author, an owner, a version, a language, a short description, copyright information, and the like.

Furthermore, the Extraction Component 24 is configured to extract additional aspect data from the document, which may not be part of the original document file but includes additional information about the document. Examples of such supplementary aspect data include a content type, a content summary, a content language, an access restriction, a sensitivity/privacy classification, a digital or physical file storage location, a usage history of the document, and the like.

The extracted metadata and supplementary aspect data obtained by the Extraction Component 24 are forwarded to the Metadata Embedding Component 27.

Content Embedding Component 26 is configured to process the semantic content extracted from the document and to generate a vector representation of this content for each document by applying a pre-trained semantic content embedding model.

The semantic content embedding vectors obtained from the Content Embedding Component 26, as well as any document identifiers and a set of (original) metadata for each document, are stored as a search index in the Content Storage Component 32. The Content Storage Component 32 is configured to store information from Documents 54, possibly including document contents and document metadata.

The custom Vector Storage Component 34 is configured to store the corresponding multi-aspect vectors for each Document 54. The multi-aspect vectors represent semantic content, metadata, and supplementary aspect data of the corresponding documents in a high-dimensional vector space.

The Client Interface 16 includes a Query Input Component 17 that is configured to receive at least one search query from a user.

The Query Embedding Component 40 is configured to receive the search query from the Client Interface 16, and to extract therefrom semantic data, metadata, and supplementary aspect data by applying pre-trained embedding models. The Query Embedding Component 40 is additionally configured to calculate a semantic content vector from the semantic data and to calculate one or more query metadata aspect vectors for each search query received. The Query Embedding Component 40 is further configured to fuse 74 the semantic query content vector with one or more query metadata aspect vectors and thereby obtain a Multi-Aspect Query Vector 78 for each search query received from the Client Interface 16.

The ANN Search Component 43 is configured to perform approximate nearest neighbour searches on the multi-aspect vectors 78 to narrow down the candidate documents before specific query-vs-documents comparisons are made. The ANN Search Component 43 may use a technique based on hierarchical navigable small world (HNSW) graphs or other suitable techniques to select a subset of documents to be compared with the Multi-Aspect Query Vector 78 before the Similarity Calculation Component 42 commences with calculating similarity metric values.

Similarity Calculation Component 42 is configured to calculate a similarity metric value associated with an individual comparison between (on the one hand) a query and (on the other hand) an individual document. Each respective similarity metric value is associated with a particular one of the documents and expresses a degree of similarity between the Multi-Aspect Query Vector and the multi-aspect vector for the associated document. The similarity metric used by Similarity Calculation Component 42 may be a weighted Euclidean inner product metric, which is discussed herein below with reference to FIG. 3.

Similarity Ranking Component 44 is configured to rank the documents based on their similarity scores obtained from the Similarity Calculation Component 42 and to retrieve the R highest ranked documents. Here, R represents a positive integer (R=1, 2, ... $\in \mathbb{N}^+$), which may be supplied by the system, by the user, or by another source).

The document retrieval component 46 is configured to fetch, from the Content Storage Component 32, the R documents that have the highest degree of similarity based on the calculated similarity metric values and to return to the user the R top-ranked documents possibly arranged by order of (ascending or descending) similarity value indicated by the Similarity Ranking Component 44.

Figure 2:
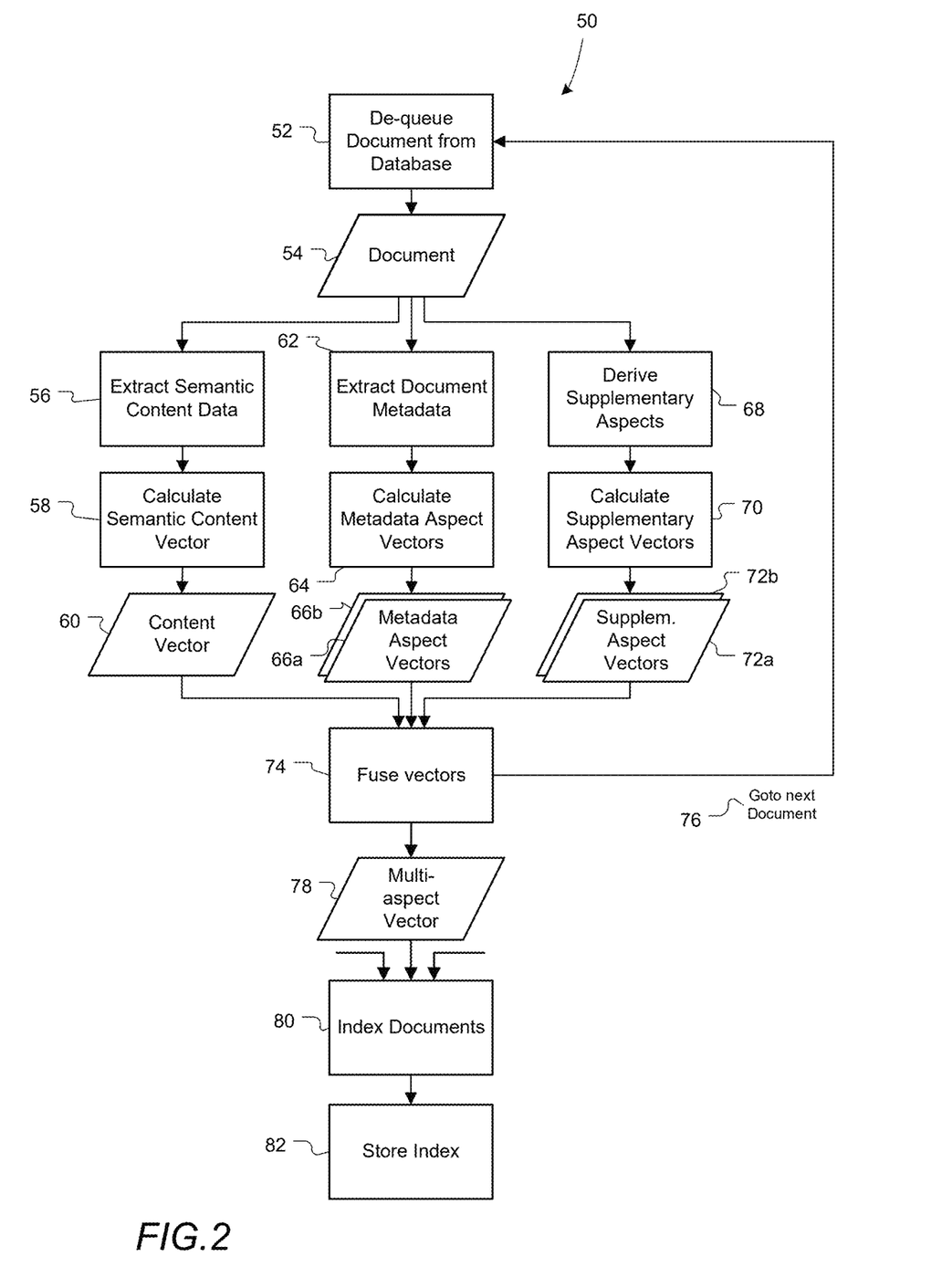
FIG. 2 shows a flowchart of a method for ingesting a collection of documents in a vector embedding system, according to an embodiment.

FIG. 2—Embedding

FIG. 2 schematically shows a flowchart illustrating an exemplary embodiment of a computer-implemented Document Ingestion Method 50 for ingesting a Document 54 into an embedding system, for instance, into the exemplary System 10 from FIG. 1.

The exemplary Document Ingestion Method 50 involves a set of operations 56-74 that are performed on individual Documents 54, which are ingested from the Document Storage 20. Through operations 56-74, a respective individual Document 54' is processed to generate a Multi-Aspect Vector 78. The transformation operations may involve pre-trained embedding models and/or pre-defined computations that map numerical or categorical aspect data into vectors that have a predetermined order and number of vector elements. The distinct Multi-Aspect Vectors 78 obtained for the respective Document 54' are stored in a vector database, like, for instance, in Vector Storage Component 34. The pre-trained embedding models and predetermined computations that are used for generating the multi-aspect vectors 78 for the documents are stored in or are otherwise made accessible to System 10 so that they remain available during subsequent operations that involve receiving and transforming a query into a vector embedding (see, e.g., FIG. 3).

Document De-queue From Database Action 52, which is executed by the Embedding Pipeline 22, involves fetching Document 54 from a collection of documents that are initially stored in Document Storage 20. Each Document 54 fetched from Document Storage 20 includes document content and one or more kinds of metadata. The retrieved Document 54 is temporarily inserted (pushed) at the back of the Embedding Pipeline 22 to allow documents to be taken out and processed one at a time and in an orderly fashion, thus providing scalability to larger workflows in which fresh documents and document updates are supplied to Document Storage 20, possibly at varying supply sizes and/or irregular intervals.

In one embodiment, Semantic Content Data Extraction Action 56, executed by the Content Embedding Component 26, includes supplying Document 54 to an OCR text extraction component (not shown), which may involve natural language processing techniques, to identify structured information about the words and layout in Document 54. Extracting Semantic Content Data 56 from Document 54 may include removing irrelevant information such as special symbols and formatting and may involve dividing Document 54 into chunks based on paragraphs and/or phrases and/or units of words, depending on the content embedding model used. Alternate embodiments may use other content extraction methods, e.g., CNN or the like.

Content Vector Semantic Calculation Action 58, also executed by the Content Embedding Component 26, involves calculating a Content Vector 60 from the semantic content data extracted 56 from Document 54. The content embedding model to Calculate Semantic Content Vector 58 transforms the extracted semantic content data into a high-dimensional Content Vector 60. The Semantic Content Vector Calculations 58 performed on the semantic content yield a first Content Vector 60, for example, indicated with $\vec{c}^j = [c_1^j \; c_2^j \; \ldots \;] \in \mathbb{R}^{Nc}$, which represents the semantic content of the $j^{th}$ document in Document Storage 20. $\mathbb{R}^{Nc}$ is an Nc-dimensional Euclidian vector space in which the set of all possible content vectors $\{\vec{c}^j\}$ resides. The dimensionality Nc of the vector space $\mathbb{R}^{Nc}$ may be very high, for example, in the order of several hundred or more. Distinct Documents 54 that have identical (or similar) semantic content yield vectors 60 that coincide with (or are located relatively close to) each other within the content vector space $\mathbb{R}^{Nc}$. Example content embedding models for generating the Content Vector 60 may include the use of Large Language Models (LLM) or Neural Networks (NN).

Document Metadata Extraction Action 62, executed by the Metadata Embedding Component 27, involves supplying the same Document 54 to a metadata extraction model. This metadata extraction model extracts existing metadata from Document 54. The one or more kinds of metadata may include one or more of a creation date of the document, a modification date of the document, a deletion date of the document, a file title of the document, a file size of the document, a file type of the document, an author of the document, an owner of the document, a version of the document, a language of the document, and a description of the document.

Metadata Aspect Vector Semantic Calculation Action 64, also executed by the Metadata Embedding Component 27, involves calculating one or more metadata aspect vectors 66a, 66b from the metadata retrieved from the respective Document 54'. Each respective Metadata Aspect Vector 66 is associated with a corresponding kind of metadata and is calculated using a determined embedding model or mapping computation for the specific kind of metadata. The calculations 64 yield K distinct metadata vectors $\vec{m}^{k,j} \equiv [m_1^{k,j} m_2^{k,j} \ldots] \in \mathbb{R}^{Nmk}$ wherein the label k (with possible integer values k=1, ..., K ($\in \mathbb{N}^+$) represents a respective distinct metadata aspect in the set of all K metadata aspects for the $j^{th}$ document. Each space $\mathbb{R}^{Nmk}$ represents an Nmk-dimensional Euclidian vector space in which the set of all possible vectors $\{\vec{m}^{k,j}\}$ for that particular metadata aspect k resides. The dimensionalities Nmk of each of the vector spaces $\mathbb{R}^{Nmk}$ (k=1, ..., K) is typically low (e.g., less than 32 dimensions). Distinct Documents 54 that have identical (or similar) metadata will yield vectors 66 that coincide with (or are located relatively close to) each other within the respective metadata vector spaces $\mathbb{R}^{Nmk}$.

Supplementary Aspects Derivation Action 68, optionally executed by the Metadata Embedding Component 27, involves processing the respective Document 54' to identify one or more kinds of supplementary aspect data, which may not be part of the original document content and metadata. This supplementary aspect data may, for instance, include a content type, a content summary, a content language, an access restriction, a sensitivity classification, a digital or physical file storage location, and/or a usage history pertaining to the corresponding Document 54.

Supplementary Aspect Vectors Calculation Action 70, also executed by the Metadata Embedding Component 27, involves calculating one or more supplementary aspect vectors 72a, 72b from Document 54. Each respective supplementary aspect vector 72 is associated with a corresponding kind of supplementary aspect data and is calculated using a distinct embedding model or mapping computation for the specific kind of supplementary aspect data. Calculating Supplementary Aspect Vectors 70 yield P distinct supplementary aspect vectors $\vec{a}^{p,j} \equiv [a_1^{p,j} a_2^{p,j} \ldots] \in \mathbb{R}^{Nap}$, wherein the label p (with possible integer values p=1, ..., P $\in \mathbb{N}^+$) represents a respective distinct supplementary aspect in the set of all P supplementary aspects for the $j^{th}$ document. Each space $\mathbb{R}^{Nap}$ represents a Nap-dimensional Euclidian vector space in which the set of all possible vectors $\{\vec{a}^{p,j}\}$ for that particular supplementary aspect p resides. The dimensionality Nap of each of the vector spaces $\mathbb{R}^{Nap}$ (p=1, ..., P) is typically low (e.g., less than 700 dimensions, and may be less than ten dimensions in some circumstances). Distinct Documents 54 that have identical (or similar) content and/or metadata characteristics may yield supplementary aspect vectors 72 that coincide with (or are located relatively close to) each other within the respective supplementary aspect vector spaces $\mathbb{R}^{Nap}$.

At Vector Fusing action 74, which is executed by the Vector Fusing Component 28, the Content Vector 60 ($\vec{c}^j$) is fused with the one or more Metadata Aspect Vectors 66 ($\vec{m}^{k,j}$ for all k) and with the one or more Supplementary Aspect Vectors 72 ($\vec{a}^{p,j}$ for all p). The fusing operation yields a Multi-Aspect Vector 78 ($\vec{d}^j$) for Document 54. The fusing 74 involves concatenating the various vectors $\vec{c}^j$ and $\vec{m}^{k,j}$ and $\vec{a}^{p,j}$ associated with Document 54 to obtain the multi-aspect vector $\vec{d}^j$. This concatenation is defined by the composite operation $\vec{c}^j \mathbb{R} \vec{m}^{1,j} \mathbb{R} \vec{m}^{2,j} \mathbb{R} \ldots \mathbb{R} \vec{a}^{1,j} \mathbb{R} \vec{a}^{2,j} \mathbb{R} \ldots = \vec{d}^j$, thus yielding the multi-aspect vector $\vec{d}^j$ that resides in a composite vector space $\mathbb{R}^N = \mathbb{R}^{Nc} \oplus \mathbb{R}^{Nm1} \oplus \mathbb{R}^{Nm2} \oplus \ldots \oplus \mathbb{R}^{Na1} \oplus \mathbb{R}^{Na2} \oplus \ldots$ Here, the binary operator symbol $\mathbb{R}$ is used to indicate a concatenation of the two vectors operands surrounding the operator, i.e. the expression $\vec{x} \mathbb{R} \vec{y}$ means $[x_1 x_2 \ldots] \mathbb{R} [y_1 y_2 \ldots]$ resulting in the composite vector $[x_1 x_2 \ldots y_1 y_2 \ldots]$. Furthermore, the binary operator symbol $\oplus$ is used to indicate the rendering of a direct product of the two vector space operands surrounding this operator.

Return Action 76 involves proceeding to Document Dequeue From Database Action 52 and fetching the next Document 54 from the collection of documents stored in Document Storage 20. The operations 52-74 are repeated for that next Document 54 so that a next Multi-Aspect Vector 78 is obtained for that next Document 54.

By repeating the operations 52-74 for each document retrieved from the Document Storage 20, a set of document vectors $\{\vec{d}^j\}$ is obtained. Each $\vec{d}^j$ represents the N-dimensional Multi-Aspect Vector 78 associated with the $j^{th}$ document in the database, and each resides in the composite N-dimensional Euclidian vector space $\mathbb{R}^N$. This space $\mathbb{R}^N$ is composed of the vector space for the semantic content $\mathbb{R}^{Nc}$ combined with all vector spaces $\mathbb{R}^{Nmk}$ (for all k=1, ..., K) for the metadata aspects and combined with all vector spaces $\mathbb{R}^{Nap}$ (for all p=1, ..., P) for the supplementary aspects. The dimensionality N of the multi-aspect vector space $\mathbb{R}^N$ is equal to Nc+Nm1+Nm2+ ... +Na1+Na2+ ....

FIGS. 3 and 4a-c—Search Querying

Figure 3:
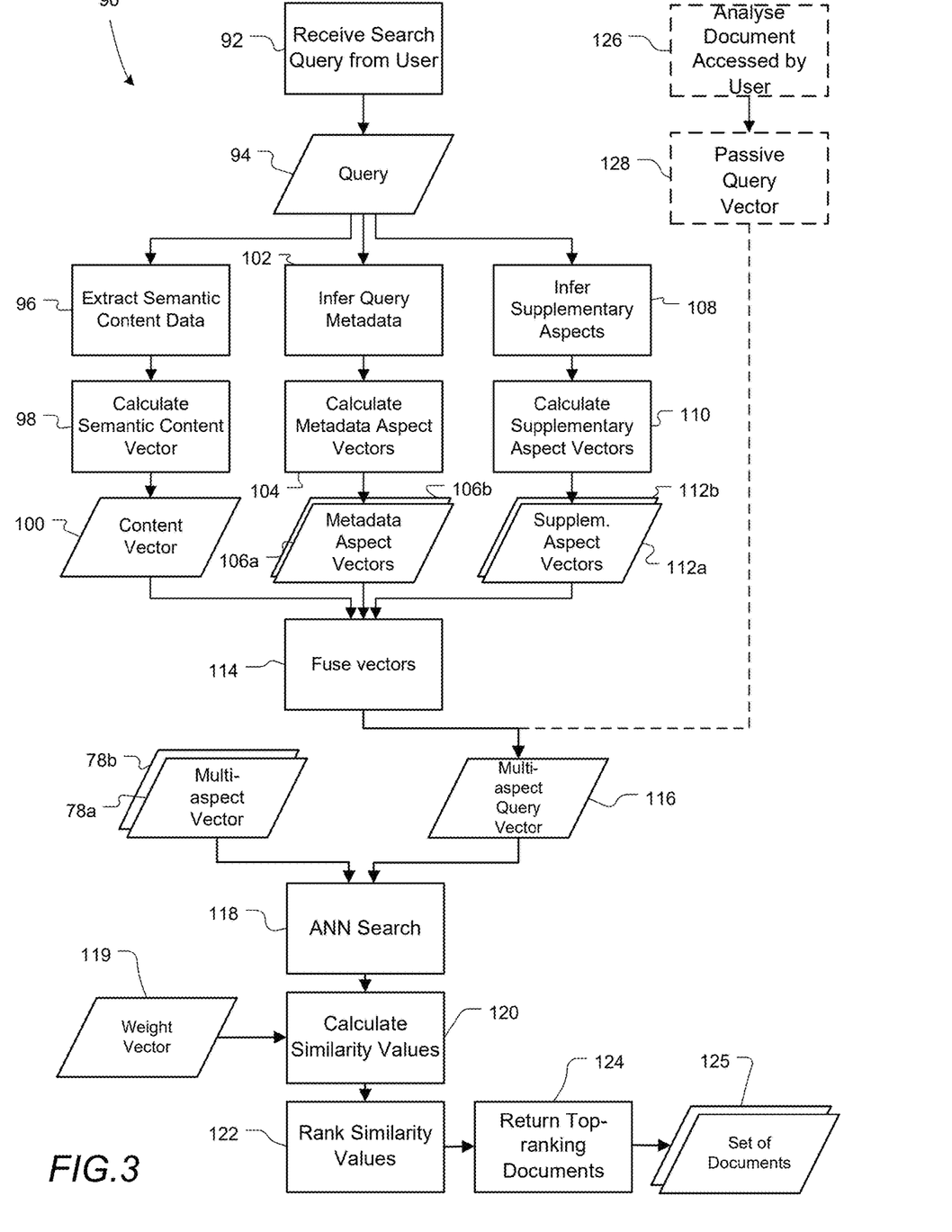
FIG. 3 shows a flowchart of a method for retrieving documents from a documents database in response to a search query, according to an embodiment.

FIG. 3 shows a flowchart that schematically illustrates an exemplary embodiment of a Document Retrieval Method 90 for retrieving relevant documents from a document database in response to an active Query 94 received from a user or a passive Query 128 generated by System 10 in response to a user accessing another document from the database.

The exemplary Document Retrieval Method 90 includes transforming Query 94/128 into a Multi-Aspect Query Vector 116 using pre-trained embedding models, calculating similarity values 120 between the Multi-Aspect Query Vector 116 and Multi-Aspect Vector 78, ranking the documents based on the calculated similarity values 122, and returning 124 the R highest ranked documents 125. The exemplary Document Retrieval Method 90 further includes the use of ANN Search 118 to reduce the number of comparisons and similarity calculations and thereby speed up the document retrieval process.

In the exemplary Document Retrieval Method 90, it is assumed that document Multi-Aspect Vectors 78 have already been computed and stored in the database 30 Vector Storage Component 34 in advance, that is, prior to the moment that the search Query 94/128 is received in the present exemplary Document Retrieval Method 90.

Search Query Receipt Action 92 involves receiving a search Query 94 from the user, which represents the information that the user actively seeks or may potentially want to receive.

Figure 4A:
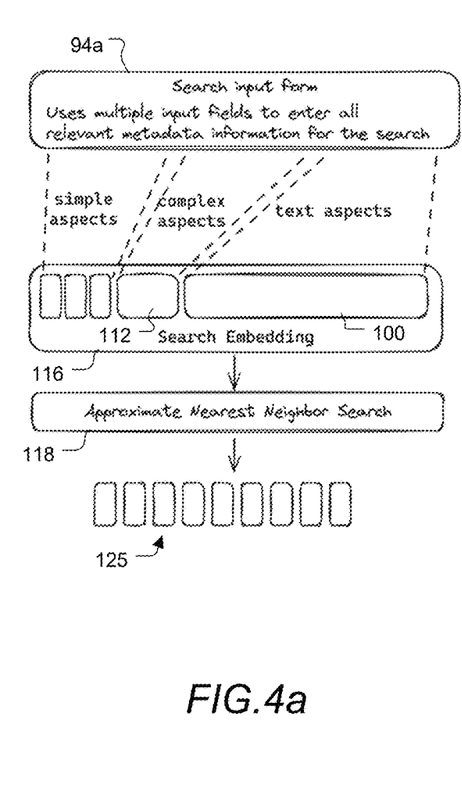
FIGS. 4a-4c schematically show exemplary methods for generating search queries, usable in various method and system embodiments.

As illustrated in FIG. 4a, the user may be presented with a digital user interface (which may be part of a desktop-based search application, a web browser, or data management system) that includes a search input form 94a with dropdown boxes, input fields, checkboxes and/or value slider elements, which allow the user to select categories and specify ranges relating to content and properties (such as content type, creation date, etc) of documents that the user desires to retrieve from the File Repository 18.

Figure 4B:
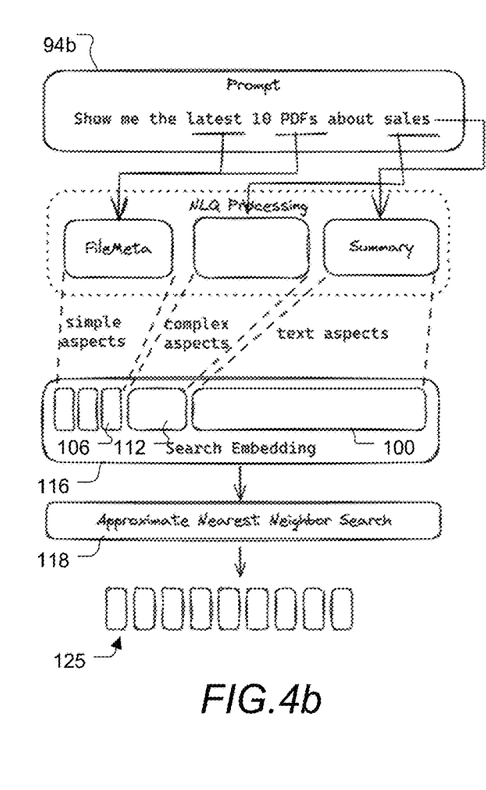

As illustrated in FIG. 4b, the user may alternatively or additionally be presented with a digital interface, including a search input form 94b with a prompt in which the user can enter a textual description or question relating to the document contents and properties that the user wants to retrieve.

Figure 4C:
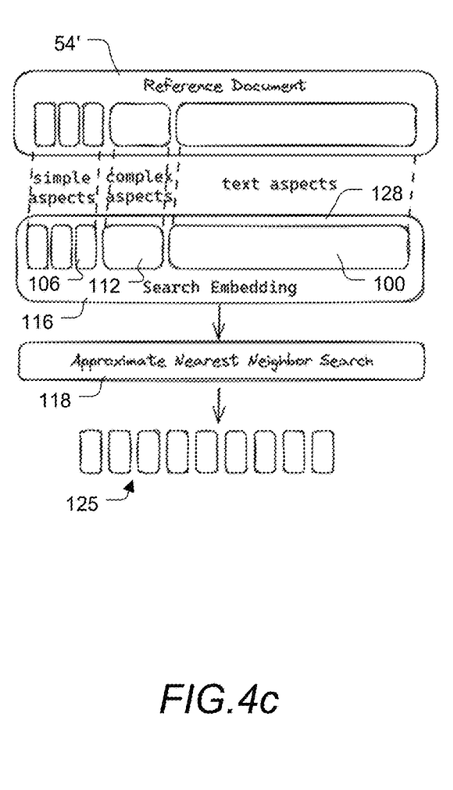

As illustrated in FIG. 4c, construction of a Multi-Aspect Query Vector 116 and retrieval of documents may alternatively or in addition be triggered when a user opens or has already accessed a particular Document 54' from the database, thereby allowing the system to analyse the document 126 and retrieve related documents that are closely related in semantic content, creation date, or any other aspect. In this case, the engine may retrieve the embedding vector that was already created and stored for the document that is currently being accessed and copy (part or all of) the existing document embedding vector to a passive Query 128 vector, after which the system proceeds by performing similarity searching 120 and ranking 122.

In each of these examples, Query 94 is processed and transformed into a multi-aspect vector using similar embedding models as were used during the processing and transforming of Documents 54 into multi-aspect vector embeddings (see, e.g., exemplary Document Ingestion Method 50 in FIG. 2).

Actions 96-114 involve extracting and transforming Query 94 into a Multi-Aspect Query Vector 116 by extracting semantic content, metadata, and supplementary aspects and calculating associated vectors using pre-defined embedding calculations and/or pre-trained embedding models in a similar manner as described herein above for actions 56-74 of exemplary Document Ingestion Method 50 performed on individual documents. These embedding rules and models may focus on different portions of the search Query 94/128.

The embedding model for the semantic content of Query 94 provided via the Prompt Query 94b (FIG. 4b) may include a natural language processing (NLP) machine learning model, such as a transformer-based model that maps the semantic content of the query into a high-dimensional vector space where semantically similar queries are closer together. The content embedding model used in action 98 for generating a vector 100 representing the semantic content of Query 94/128 may be analogous to the content embedding model that is used in action 58 for generating embedding vectors 60 representing the semantic contents of the individual Documents 54.

In Vector Fusing action 114, the output vectors, Content Vector 100, Metadata Aspect Vector(s) 106, and Supplemental Vector(s) 112, of the associated transformation calculations, Semantic Content Vector Calculation 98, Metadata Aspect Vector Calculation 104, and Supplementary Aspect Vector Calculation 110, are fused to obtain a Multi-Aspect Query Vector 116 ($\vec{q}^j \in \mathbb{R}^N$), where N is the same dimensionality (e.g., sum of all the dimensions of Content Vector 100, Metadata Aspect Vectors 106, and Supplementary Aspect Vectors 112) of the multi-aspect vector space as described herein above. Query 94/128 is thus mapped into the same vector space and follows the same mapping rules as the rules that were used during the embedding of the Multi-Aspect Vectors 78 for Documents 54. This mapping congruency ensures that Queries 94 and Documents 54, which are considered close with respect to the semantic content, the metadata, and the supplementary aspect content, will be transformed into Multi-Aspect Vector 78 and Multi-Aspect Query Vector 116 that are closer together in this vector space $\mathbb{R}^N$. Queries 94/128 can thereby be approximately matched (i.e., determined to be sufficiently close) to relevant Documents 54, even if there are no exact matches between keywords in Query 94/128 and semantic contents and metadata in the Documents 54.

ANN Search Action 118 involves optimizing the search process in case a large volume of documents is stored in the database 30. This optimization may involve an approximate nearest neighbour (ANN) search indexing technique to reduce the set of candidate documents and the number of Similarity Values Calculations 120 of specific similarity metric values needed to find the most relevant documents. In this example, the ANN search optimizer involves a Hierarchical Navigable Small World (HNSW) graph-based method that organizes the multitude of document Multi-Aspect Vectors 78 in a graph structure, wherein each graph node (or "vertex") represents a vector and selected graph nodes that represent similar vectors are interconnected by edges (or "links"). The use of the HNSW graph renders the matching computation phase more efficient and thus enables fast nearest neighbour searches.

Similarity Values Calculation Action 120 represents a query-to-document matching phase, which is executed after Query 94 has been Fused 114 into a Multi-Aspect Query Vector 116. Calculating Similarity Values 120 involves calculating a similarity metric value that attributes a numerical value to a degree of closeness between the Multi-Aspect Query Vector 116 and Multi-Aspect Vectors 78. In this example, the similarity metric is a Weighted Euclidian Inner Product metric M, which is computed by the following expression:

$$M(\vec{q}, \vec{d}^j, \vec{w}) = \frac{\sum_{i=1}^{N} w_i \cdot q_i \cdot d_i^j}{\|\vec{q}\| \cdot \|\vec{d}^j\|}$$

Here:

$\vec{q}$ represents the Multi-Aspect Query Vector 116;

$\|\vec{q}\|$ represents the magnitude of the Multi-Aspect Query Vector 116. In general, a magnitude $\|\vec{x}\|$ of a generic N-dimensional vector z is defined as $\|\vec{x}\| = \sqrt{\sum_{i=1}^{N} x_i^2}$ $\vec{d}^j$ represents the Multi-Aspect Vector 78j for the $j^{th}$ document;

$\|\vec{d}^j\|$ represents the magnitude of the Multi-Aspect Vector 78j for the $j^{th}$ document;

$\vec{w}$ represents a masking/Weight Vector 119, which has the same dimensionality as the Multi-Aspect Query Vector 116 and the document Multi-Aspect Vector 78. The Weight Vector 119 has vector components $w_i$ that each have a determined value in a range between −1 and 1;

The summation of weighted products $\Sigma w_i \cdot q_i \cdot d^j_i$ represents a modified vector inner product between the query vector $\vec{q}$ and a respective vector $\vec{d}^j$ of the set of all document vectors $\{\vec{d}^j\}$.

By setting each weight $w_i$ for the various aspects to a particular value within the range [−1, 1], the Similarity Values Calculation 120 120 is allowed to attribute different levels of importance to the various vector contributions and aspects and, in particular, is allowed to ignore certain metadata and supplementary aspects by setting their corresponding aspect-weights to 0.

The weighted Euclidian inner product distance value for the query vector $\vec{q}$ relative to a document vector $\vec{d}^j$ is calculated for all the document vectors $\{\vec{d}^j\}_{all\ j}$ or for a selected subset of document vectors $\{\vec{d}^j\}_{subset\ of\ j}$, to determine a similarity metric value for the query vector $\vec{q}$ relative to each of all documents or relative to each of the selected subset of document vectors.

One benefit of including using Multi-Aspect Vectors 78 and Multi-Aspect Query Vectors 116 that have additional information beyond the contents of a document in the Similarity Values Calculation 120 is that it may eliminate the need for a post-filtering step to locate similar documents and may actually include similar documents that would have been excluded in a post-filtering query.

Value Similarity Ranking Action 122 represents a phase in which the calculated similarity values of Similarity Values Calculation 120 are sorted in descending order, assuming that the similarity metric is defined (or transformed) in such a way as to indicate a closer match with a higher metric value. In alternative embodiments, this action 122 may involve sorting the calculated metric results in an alternate order, e.g., ascending order, depending on the definition and sign of the closeness metric being used in Similarity Values Calculation 120.

In Top-Ranking Document Return Action 124, the Set of R Documents 125 with the highest-ranking similarity metric values representing the smallest distances are retrieved from the Document Storage 20. The integer size R may be fixed or selected by the user. The Set Of Documents 125 retrieved documents are provided to the user via the Client Interface 16. Alternatively, or in addition, System 10 may provide the user information regarding the retrieved Set of Documents 125, such as document identification tags, which may allow the user to gain access to these documents.

Figure 5A:
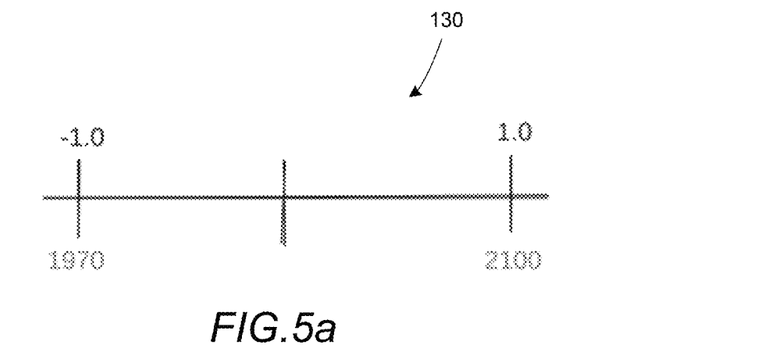
FIGS. 5a-5c schematically show exemplary metadata vector embeddings and supplementary aspect data vector embeddings, usable in various method and system embodiments.
Figure 5B:
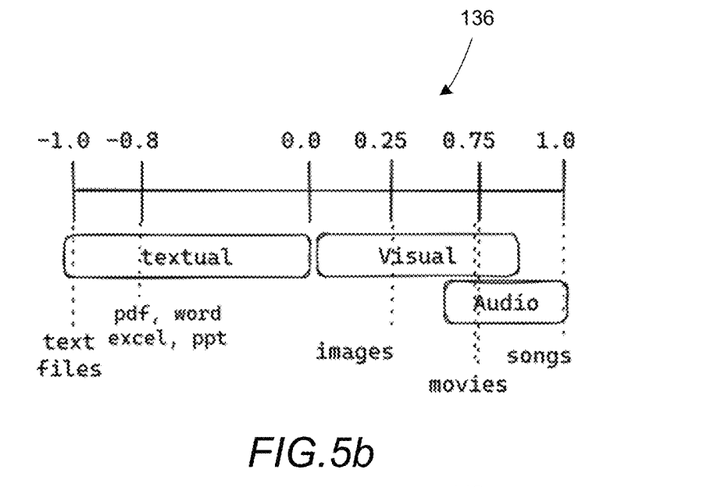
Figure 5C:
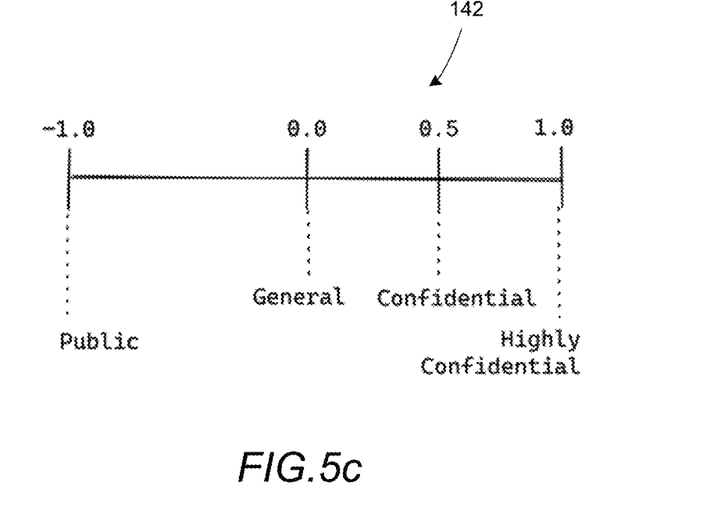

FIGS. 5a-5c—Extract Document Aspects

FIGS. 5a-5c schematically illustrate exemplary metadata aspects that may be extracted by the methods and systems according to the present invention, for instance, by the exemplary System 10 shown in FIG. 1 or in the exemplary Document Ingestion Method 50 shown in FIG. 2.

FIG. 5a shows an exemplary one-dimensional vector (sub)space 130 onto which the creation date of each document may be mapped using a metadata embedder.

In this example, the creation date metadata embedding involves specifying a minimum year value (e.g., 1970) and a maximum year value (e.g., 2100), followed by normalizing the minimum year value to the minimum vector value −1.0 and normalizing the maximum year value to the maximum vector value +1.0 in the vector subspace.

The current time value corresponding with the creation date of the document indicated in the document metadata is extracted and is used as input for a linear interpolation function that transforms the linear distance of the creation date between the minimum and maximum year values into a linear vector position between −1.0 and +1.0.

FIG. 5b shows another exemplary one-dimensional vector (sub)space 136 onto which the document content type of each document may be mapped using a supplementary metadata embedder. The content type may first have been extracted from Document 54 as supplementary metadata using a separate data enrichment process (see, e.g., Supplementary Aspect Derivation 68 in FIG. 2).

In this example, the content-type embedding involves choosing discrete document content classes, such as text files, PDF files, word files, image files, video files, and audio files, and then associating each content class with a specific value in the vector subspace to be produced by the Metadata Embedding Component 27 from each input document. For instance, documents with a document content class "text file" may be mapped onto the value −1.0, documents with a content class "image file" may be mapped onto the value +0.25, documents with a content class "video file" may be mapped onto the value +0.75, and documents with a content class "audio file" may be mapped onto the value +1.0. Using this exemplary convention, documents with a purely textual content class will be mapped into the vector (sub)space to a value of −1.0. In contrast, purely audio documents will be mapped to a value of +1.0.

FIG. 5c shows yet another exemplary one-dimensional vector (sub)space 142 onto which the sensitivity level of each document may be mapped using a supplementary metadata embedder. Again, this sensitivity level data may first have been extracted from the document as supplementary metadata in a separate enrichment process, which may also be executed by the Metadata Embedding Component 27. In this example, the sensitivity-level embedding involves choosing discrete document sensitivity levels, such as "public", "general", "confidential", and "highly confidential", and then mapping the specific sensitivity level of each document onto a sensitivity-level specific value in the 1-dimensional vector subspace. This mapping may be performed by the Metadata Embedding Component 27 from each input document received. For instance, documents with a sensitivity level of "public" may be mapped onto the value −1.0, documents with a sensitivity level of "general" may be mapped onto the value 0.0, documents with a sensitivity level of "confidential" may be mapped onto the value +0.5, and documents with sensitivity level "highly confidential" may be mapped onto the value +1.0.

Other Embodiments

The various embodiments may be embodied in other specific forms. The described embodiments are to be considered in all respects only as illustrative and not restrictive. The intended scope of the protection is, therefore, indicated by the appended claims rather than by the foregoing description. It will be apparent to the person skilled in the art that alternative embodiments can be conceived and reduced to practice. All changes that come within the meaning and range of equivalency of the claims are to be embraced within their scope to the extent permitted by applicable national laws and/or intergovernmental agreements.

Computer Considerations

Those of skill in the art would understand that information and signals may be represented using any of a variety of different technologies and techniques. Those of skill would further appreciate that the various illustrative logical blocks, components, circuits, and algorithm steps described in connection with the embodiments disclosed herein may be implemented as electronic hardware, computer software, or combinations of both. To illustrate this interchangeability of hardware and software, various illustrative components, blocks, components, circuits, and steps have been described above generally in terms of their functionality. Whether such functionality is implemented as hardware or software depends upon the particular application and design constraints imposed on the overall system. Skilled artisans may implement the described functionality in varying ways for each particular application. Still, such implementation decisions should not be interpreted as causing a departure from the scope of the claimed embodiments.

Figure 6:
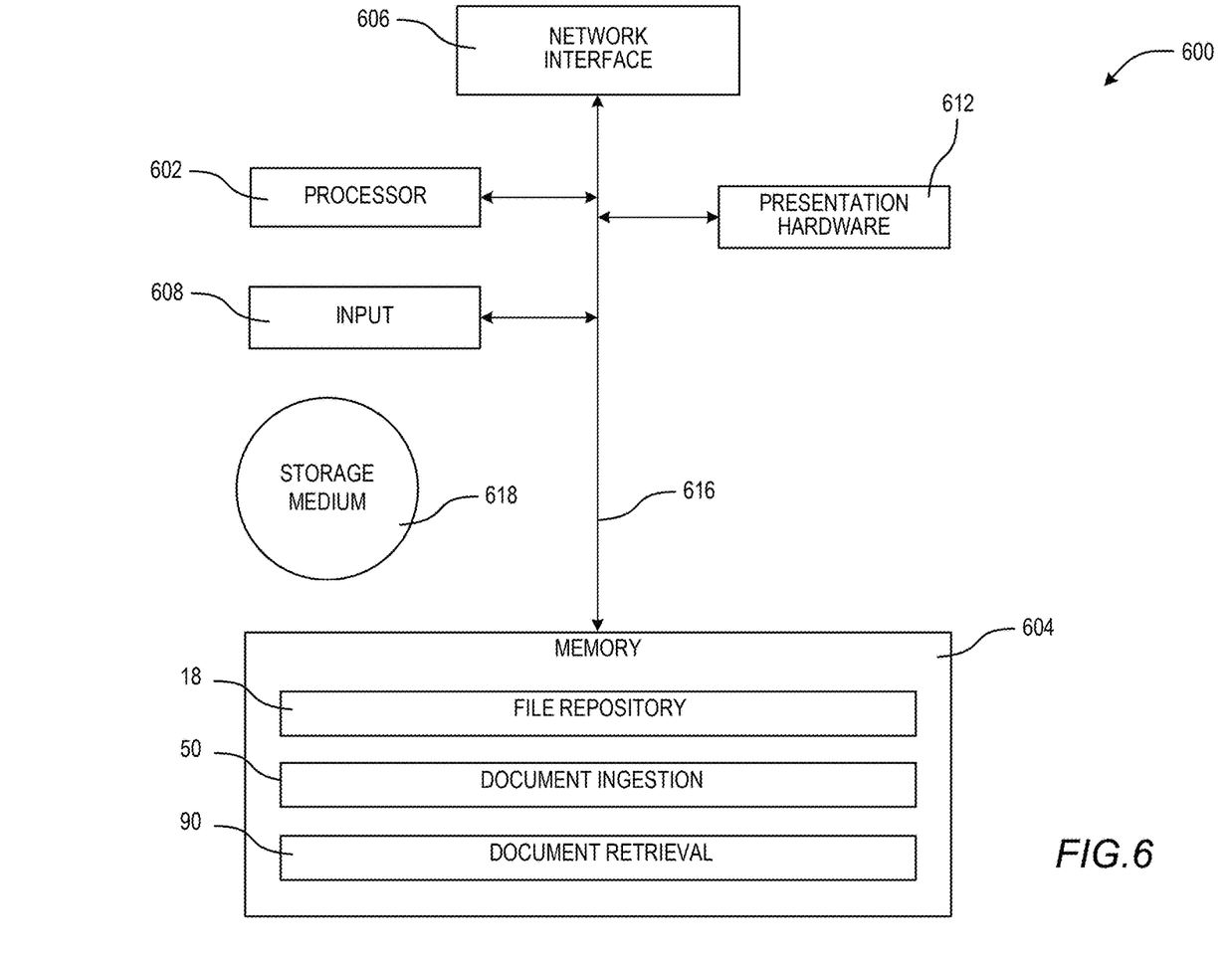
FIG. 6 shows a simplified computing device ingesting and retrieving documents, according to an embodiment.

Referring now to FIG. 6, an exemplary computing device 600 is shown, in which one or more technologies may be implemented. Computing Device 600 may include one or more instances of processors 602, of memories 604, of inputs 608, and of (display screens or other) presentation hardware 612, all interconnected along with the network interface 606 via a bus 616. One or more network interfaces 606 allow computing device 600 to connect via the Internet or other networks 150, 250). Memory 604 generally comprises a random access memory ("RAM"), a read-only memory ("ROM"), and a permanent mass storage device, such as a disk drive.

Memory 604 may contain one or more instances of a file repository 18, Document Ingestion Method 50, Document Retrieval Method 90, or other informational data described herein. These and other software components may be loaded from a non-transitory computer-readable storage medium 618 into memory 604 of the computing device 600 using a drive mechanism (not shown) associated with a non-transitory computer-readable storage medium 618, such as a floppy disc, tape, DVD/CD-ROM drive, flash card, memory card, or the like. In some embodiments, software or other digital components may be loaded via the network interface 606 rather than via a computer-readable storage medium 618. In some embodiments, Computing Device 600 may include many more components than those shown in FIG. 6. Still, not all conventional components of a computing device need to be shown in order to disclose an illustrative embodiment.

The various illustrative logical blocks and components described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, solid state disk, removable disk, CD/DVD-ROM, or any other form of storage medium known in the art. An exemplary storage medium is coupled to the processor such that the processor can read and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The invention claimed is:

1. A computer-implemented method for creating a search index for a collection of documents stored in a document storage, and for retrieving one or more documents from the collection based on a query;
    wherein the method comprises, for each respective document:
        calculating, using a content embedding model, a content vector from the content of the respective document;
        calculating one or more metadata aspect vectors, each respective metadata aspect vector associated with a corresponding kind of metadata and being calculated using a metadata embedding model;
        fusing the content vector with the one or more metadata aspect vectors, to obtain a multi-aspect vector for the document, and
        storing the multi-aspect vector in a vector database;
    wherein the method further comprises:
        receiving, from a query processing engine, a multi-aspect query vector composed of a semantic content vector and one or more metadata aspect vectors associated with content and metadata of the query, the multi-aspect query vector having a dimension and element ordering corresponding to the multi-aspect vectors obtained for the documents;
        calculating similarity metric values based on comparisons between the multi-aspect query vector and each of a subset or all of the multi-aspect vectors for the respective documents in the digital document database;
        ranking the calculated similarity metric values in consecutive order of value, and
        providing, to a user via a user interface, an indication of a subset of the digital documents for which the calculated similarity metric values are optimal.

2. The method according to claim 1, wherein the one or more kinds of metadata comprise one or more of a creation date of the document, a modification date of the document, a deletion date of the document, a file title of the document, a file size of the document, a file type of the document, an author of the document, an owner of the document, a version of the document, a language of the document, and a short description of the document.

3. The method according to claim 1, further comprising, for each respective document:
    processing the respective document to identify one or more kinds of supplementary aspect data, including one or more of a content type, a content summary, a content language, an access restriction, a sensitivity classification, a digital or physical file storage location, and a usage history pertaining to the corresponding digital document;
    calculating one or more supplementary aspect vectors, each respective supplementary aspect vector being associated with a corresponding kind of supplementary aspect data and being calculated using a determined supplementary aspect embedding model;
    wherein fusing to obtain the multi-aspect vector further comprises fusing the one or more supplementary aspect vectors.

4. The method according to claim 1, wherein the fusing includes concatenating the semantic content vector with the one or more metadata aspect vectors and optionally with the one or more supplementary aspect vectors in a predetermined order that is maintained for each of the documents, thereby obtaining a collection of multi-aspect vectors that all have identical dimensions and internal logical ordering of the semantic content vector, the one or more metadata aspect vectors, and optionally the one or more supplementary aspect vectors.

5. The method according to claim 1, further comprising:
preprocessing the respective document using a machine learning model to extract keywords, phrases, and/or concepts relating from the content of the respective document;
wherein calculating the semantic content vector for the document includes processing the extracted keywords, phrases, and/or concepts by the content embedding model to obtain the semantic content vector residing in a high-dimensional content vector space, and wherein documents that have similar semantic content will yield semantic content vectors that are located relatively close to each other within the content vector space.

6. The method according to claim 1, further comprising:
executing approximate nearest neighbour processing involving a hierarchical navigable small world graph technique on the multi-aspect vectors, to generate clusters of documents and corresponding multi-aspect vectors that are presumed to have high similarity in semantic content, metadata and supplementary aspect data.

7. The method according to claim 1, further including inserting any fresh document that is newly added to the digital document database into an embedding pipeline, which then automatically executes the calculating of the semantic content vector, the calculating of the one or more metadata aspect vectors, and the fusing and obtaining of the multi-aspect vector for the fresh document.

8. The method according to claim 1, further comprising:
receiving, from the user and via the user-interface, a search query containing a set of user-supplied search terms relating to semantic content and/or metadata of the documents in the digital document database;
processing the search query to extract first terms pertaining to document content and second terms pertaining to one or more kinds of document metadata;
calculating a semantic content vector from the first terms by using a query content embedding model;
calculating one or more query metadata aspect vectors, each respective query metadata aspect vector being associated with a respective kind of metadata, and by using metadata embedding models for the respective kind of metadata;
fusing the semantic query content vector with the one or more query metadata aspect vectors to obtain the further multi-aspect query vector for the search query.

9. The method according to claim 8, further comprising, for each query:
processing the query to identify one or more kinds of supplementary aspect data pertaining to the query;
calculating one or more supplementary aspect vectors, each respective supplementary aspect vector being associated with a corresponding kind of supplementary aspect data and being calculated using a determined supplementary aspect embedding model;
wherein fusing to obtain the multi-aspect query vector further comprises fusing the one or more supplementary aspect vectors.

10. The method according to claim 1, wherein calculating the similarity metric values for respective ones of the digital documents includes utilizing a weighted Euclidean inner product as a similarity metric for comparing the multi-aspect vector with the multi-aspect query vector, the weighted Euclidian inner product being defined as $$M(\vec{q}, \vec{d}^j, \vec{w}) = \frac{\sum_{i=1}^{N} w_i \cdot q_i \cdot d_i^j}{\|\vec{q}\| \cdot \|\vec{d}^j\|}$$

wherein $\vec{q}$ and $\|\vec{q}\|$ represent the multi-aspect query vector and its magnitude, respectively; wherein $\vec{d}^j$ and $\|\vec{d}^j\|$ represent the multi-aspect vector (78j) for the $j^{th}$ document and its magnitude, respectively; and
wherein $\vec{w}$ represents a masking vector, with each vector component $w_i$ having a value in a range between −1 and 1.

11. The method according to claim 1, wherein ranking the calculated similarity metric values comprises applying a relevance ranking algorithm that accounts for both semantic similarity and metadata similarity, wherein higher similarity scores correspond to higher ranking positions; and
wherein providing the indication of the subset of digital documents includes retrieving and returning an integer number R of highest-ranking documents as search results.

12. The method according to claim 1, further comprising:
performing an approximate nearest neighbour (ANN) search in the digital document database, the ANN search involving a hierarchical navigable small world (HNSW) graph technique to find a reduced subset of documents and corresponding multi-aspect vectors to compare with the multi-aspect query vector before calculating the similarity metric values.

13. A computing system comprising a processor and a memory configured to retrieve one or more documents from a collection of documents using vector embeddings, the system further configured to:
preprocess each of the documents (54) in the collection and to generate multi-aspect vectors for each document using predetermined embedding models, wherein the multi-aspect vectors represent semantic content, metadata, and possibly supplementary aspect data, of the corresponding documents in a high-dimensional vector space;
store the documents including document content, document metadata, and corresponding multi-aspect vectors for each document;
receive at least one search query;
generate a further multi-aspect query vector for each search query received;
calculate similarity metric values by comparing the multi-aspect query vector to a selection or all of the multi-aspect vectors stored for the documents, and
return a selection of the stored documents that are ranked based on the similarity metric values.

14. The system according to claim 13, wherein calculating similarity metric values utilizes a weighted Euclidean inner product as a similarity metric for comparing the multi-aspect vector with the multi-aspect query vector, the weighted Euclidian inner product being defined as $$M(\vec{q},\vec{d}^j,\vec{w}) = \frac{\sum_{i=1}^{N} w_i \cdot q_i \cdot d_i^j}{\|\vec{q}\| \cdot \|\vec{d}^j\|}$$

wherein $\vec{q}$ and $\|\vec{q}\|$ represent the multi-aspect query vector and its magnitude, respectively; wherein $\vec{d}^j$ and $\|\vec{d}^j\|$ represent the multi-aspect vector for the $j^{th}$ document and its magnitude, respectively; and wherein $\vec{w}$ represents a masking vector, with each vector component $w_i$ having a value in a range between −1 and 1.

15. The system according to claim 13, further configured to receive a search query from a user; and to extract semantic data, metadata, and possibly supplementary aspect data from the search query, to calculate a semantic query content vector from the semantic data, to calculate one or more query metadata aspect vectors, each respective query metadata aspect vector being associated with a respective item of metadata, and to fuse the semantic query content vector with the one or more query metadata aspect vectors to obtain the multi-aspect query vector for each search query received.

16. The system according to claim 13, further configured to rank the documents based on the obtained similarity metric values;

and to select and retrieve R highest-ranked documents.

17. The system according to claim 13, further configured to perform an approximate nearest neighbour search on the multi-aspect vectors to select a subset of documents for comparison with the further multi-aspect query vector before the similarity metric values are calculated, wherein the approximate nearest neighbour search uses a technique based on hierarchical navigable small world graphs.

18. A non-transitory computer-readable medium storing instructions that, when executed by a processor, carry out a method for creating a search index for a collection of documents stored in a document storage, and for retrieving one or more documents from the collection based on a query;

wherein the method comprises, for each respective document:

calculating, using a content embedding model, a content vector from the content of the respective document;

calculating one or more metadata aspect vectors, each respective metadata aspect vector associated with a corresponding kind of metadata and being calculated using a metadata embedding model;

fusing the content vector with the one or more metadata aspect vectors, to obtain a multi-aspect vector for the document, and storing the multi-aspect vector in a vector database;

wherein the method further comprises:

receiving, from a query processing engine, a multi-aspect query vector composed of a semantic content vector and one or more metadata aspect vectors associated with content and metadata of the query, the multi-aspect query vector having a dimension and element ordering corresponding to the multi-aspect vectors obtained for the documents;

calculating similarity metric values based on comparisons between the multi-aspect query vector and each of a subset or all of the multi-aspect vectors for the respective documents in the digital document database;

ranking the calculated similarity metric values in consecutive order of increasing or decreasing value, and providing, to a user via a user interface, an indication of a subset of the digital documents for which the calculated similarity metric values are optimal.

19. The non-transitory computer-readable medium according to claim 18, where the method further comprises, for each respective document:

processing the respective document to identify one or more kinds of supplementary aspect data, including one or more of a content type, a content summary, a content language, an access restriction, a sensitivity classification, a digital or physical file storage location, and a usage history pertaining to the corresponding digital document;

calculating one or more supplementary aspect vectors, each respective supplementary aspect vector being associated with a corresponding kind of supplementary aspect data and being calculated using a determined supplementary aspect embedding model;

wherein fusing to obtain the multi-aspect vector further comprises fusing the one or more supplementary aspect vectors.

20. The non-transitory computer-readable medium according to claim 18, wherein calculating the similarity metric values for respective ones of the digital documents includes utilizing a weighted Euclidean inner product as a similarity metric for comparing the multi-aspect vector with the multi-aspect query vector, the weighted Euclidian inner product being defined as $$M(\vec{q},\vec{d}^j,\vec{w}) = \frac{\sum_{i=1}^{N} w_i \cdot q_i \cdot d_i^j}{\|\vec{q}\| \cdot \|\vec{d}^j\|}$$

wherein $\vec{q}$ and $\|\vec{q}\|$ represent the multi-aspect query vector and its magnitude, respectively; wherein $\vec{d}^j$ and $\|\vec{d}^j\|$ represent the multi-aspect vector (78j) for the $j^{th}$ document and its magnitude, respectively; and wherein $\vec{w}$ represents a masking vector, with each vector component $w_i$ having a value in a range between −1 and 1.

* * * * *